United States Patent [19]

Lueschen

[11] Patent Number: 5,680,026
[45] Date of Patent: Oct. 21, 1997

[54] TOOL BELT WITH BATTERY ASSEMBLY

[75] Inventor: William K. Lueschen, Cedarburg, Wis.

[73] Assignee: Tyton Corporation, Milwaukee, Wis.

[21] Appl. No.: 215,921

[22] Filed: Mar. 21, 1994

[51] Int. Cl.[6] .................................................. H01M 10/46
[52] U.S. Cl. ..................... 320/2; 320/15; 224/902
[58] Field of Search .......................... 320/2, 5, 15, 17; 224/240, 902, 904

[56] References Cited

U.S. PATENT DOCUMENTS

| | | |
|---|---|---|
| 1,779,207 | 10/1930 | Candar . |
| 2,304,367 | 12/1942 | Meyer et al. ........................ 224/5 |
| 2,625,192 | 1/1953 | Kinskie . |
| 3,274,476 | 9/1966 | Wildum ............................. 320/2 |
| 3,828,201 | 8/1974 | Allen, Sr. ........................ 320/16 X |
| 3,919,615 | 11/1975 | Niecke ............................. 320/2 |
| 4,108,341 | 8/1978 | Pettinger ....................... 320/2 X |
| 4,411,267 | 10/1983 | Heyman ........................... 128/385 |
| 4,748,344 | 5/1988 | Sing ............................... 320/2 X |
| 4,793,385 | 12/1988 | Dyer et al. ...................... 140/123.6 |
| 4,845,650 | 7/1989 | Meade et al. ................... 224/269 X |
| 4,957,231 | 9/1990 | Kalisher ......................... 224/901 X |
| 4,997,011 | 3/1991 | Dyer et al. . |
| 5,042,535 | 8/1991 | Schlottke ......................... 140/93 |
| 5,064,108 | 11/1991 | Headley ......................... 224/902 X |
| 5,205,328 | 4/1993 | Johnson et al. ................. 140/93.2 |

*Primary Examiner*—Edward Tso
*Attorney, Agent, or Firm*—Ryan, Maki, Mann & Hohenfeldt, S.C.

[57] ABSTRACT

Disclosed herein is an apparatus comprising: a battery assembly including exactly five parallel rows of C cells, each row having exactly four C cells arranged end to end in series, all of the rows being electrically connected together in series, a casing which surrounds the rows, a cable having a first end inside the casing, the first end of the cable having a first lead electrically connected to one end of the series connection of the rows, and the first end of the cable having a second lead electrically connected to the other end of the series connection of the rows, the cable having a second end outside the casing, and a male connector electrically connected to the second end of the cable; a belt adapted to be worn around the waist of a user, the belt having an adjustable girth so as to fit users having different waist sizes; a pocket supported by the belt and slideably movable along the girth of the belt, the pocket closely housing the battery assembly; and a portable, hand held, electrically powered cable tie tensioning tool, the tool having a female connector connected to the male connector of the battery assembly.

30 Claims, 4 Drawing Sheets

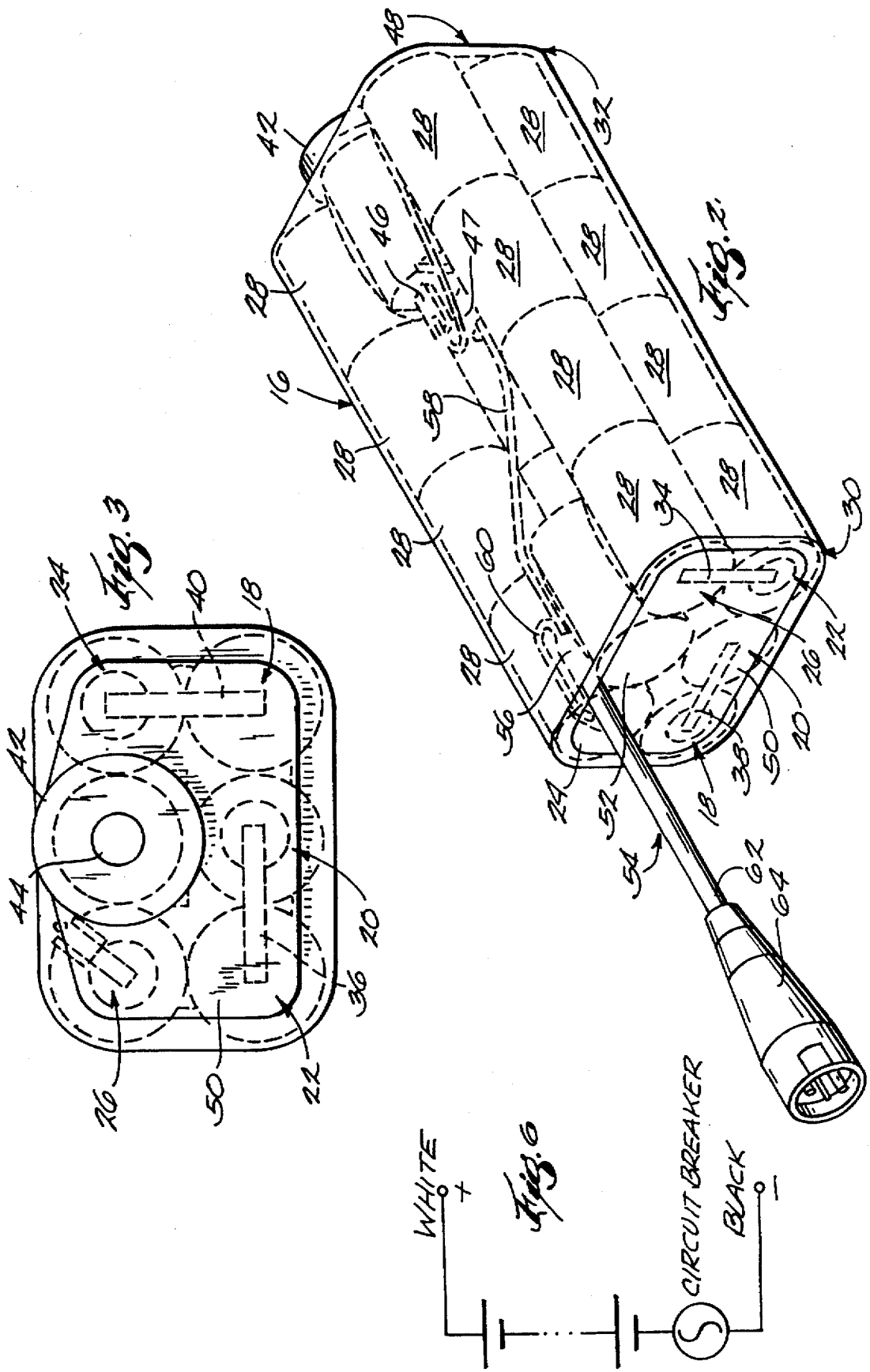

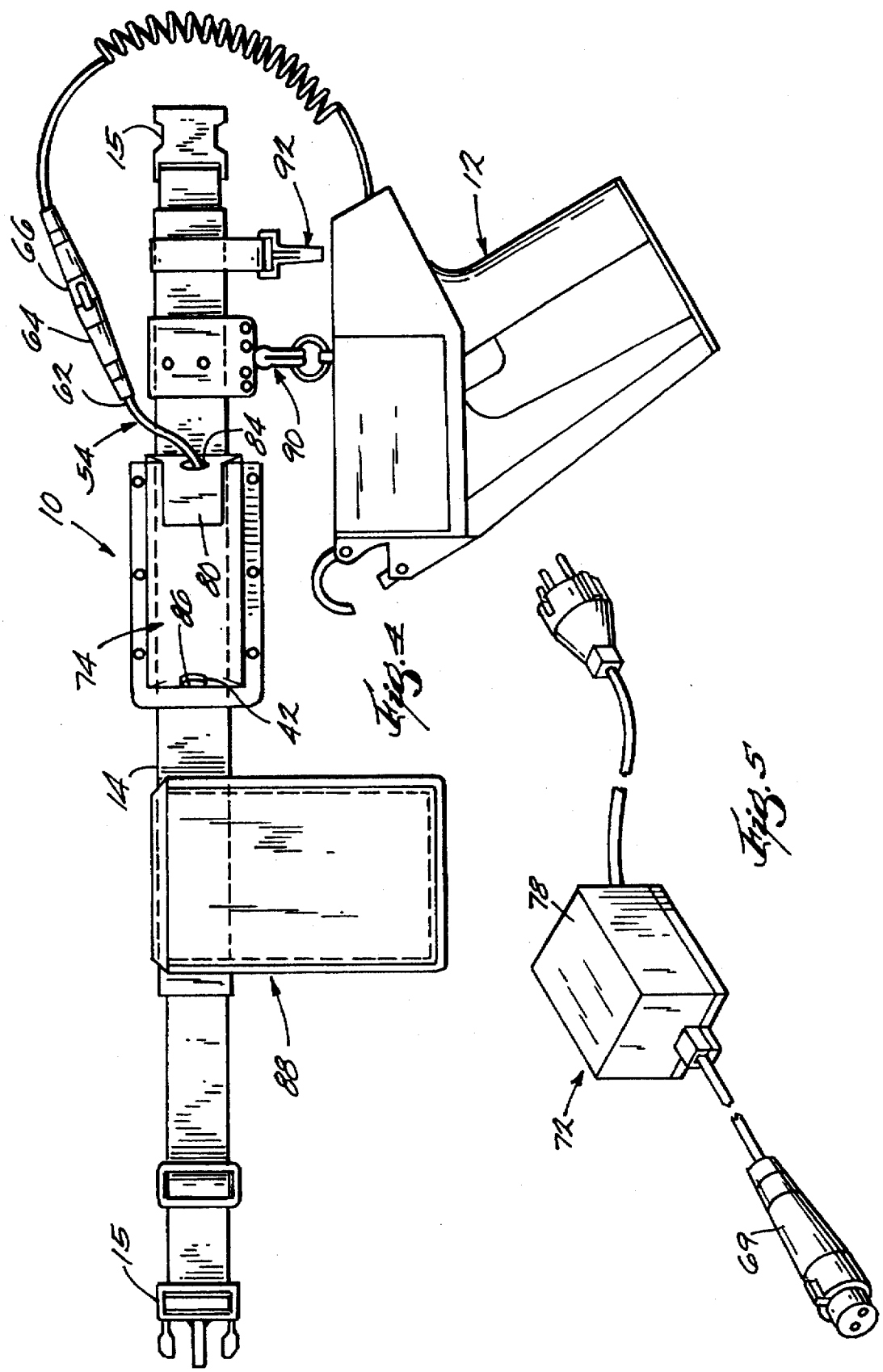

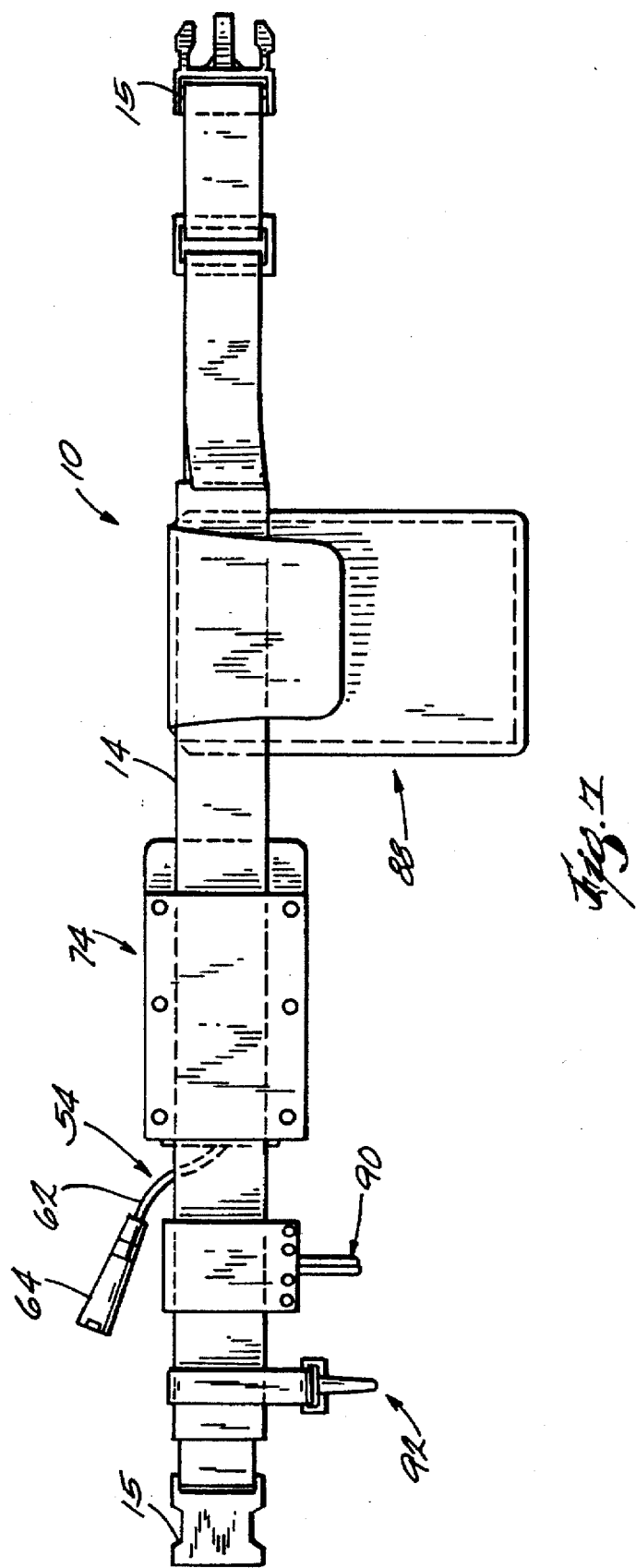

TOOL BELT WITH BATTERY ASSEMBLY

BACKGROUND OF THE INVENTION

The present invention relates generally to belt battery packs which can be worn by a user and which can provide portable power for operating electrical power tools, such as hand held tensioning and cutting tools for applying high tension to flexible cable ties and cutting the tie tails thereof.

Flexible cable ties are widely used in a variety of applications to bundle multiple wires or cables. Such cable ties typically include an elongated tail portion which is threaded through an integral head portion to encircle the wires, and the tie tail is drawn through the cable tie head to tightly bind the cables into a bundle. After the tie is tensioned around the cable bundle, the excess length of the tie tail extending out of the head portion is then severed close to the head by the tool.

Attention is directed to U.S. Pat. No. 5,042,535, issued to Schlottke on Aug. 27, 1991, which discloses an automatic tie gun, and which is incorporated herein by reference.

Another electrically powered portable cable tie tool is disclosed in U.S. Pat. No. 5,205,328, which is incorporated herein by reference.

SUMMARY OF THE INVENTION

The invention provides a battery pack which is portable and which supplies power for operating electrical power tools, such as hand held tensioning and cutting tools. One embodiment of the invention provides a battery pack which provides portable power for operating the automatic tie gun disclosed in U.S. Pat. No. 5,042,535, issued to Schlottke on Aug. 27, 1991.

One aspect of the invention provides a battery pack including a web-type belt supporting a battery assembly, which belt fits adjustably around the waist of a user.

In another aspect of the invention, the battery assembly is housed in a pocket supported by the belt, and the pocket provides for replacement of the battery assembly. More particularly, the pocket has a cover in the form of a flap, which is movable between a closed position for retaining the battery assembly in the pocket, and an open position for removal of the battery assembly. In one aspect of the invention, the flap is fastened in its closed position by a velcro™ fastener. In another aspect of the invention, the flap has therethrough an aperture through which passes a cable electrically connected to the batteries in the battery assembly. In another aspect of the invention, the cable terminates in a male Neutrik™ connector which is selectively connectable to a female Neutrik™ connector on an automatic cable tie tensioning tool. In another aspect of the invention, the batteries in the battery assembly are rechargeable, and the same male Neutrik™ connector of the battery assembly is selectively connected to a female Neutrik™ connector of a battery recharger for recharging of the batteries in the battery assembly without having to remove the battery assembly from the pocket in which it is housed.

In another aspect of the invention, the battery assembly includes a resettable pushbutton circuit protector. In another aspect of the invention, the pocket in which the battery assembly is housed has an aperture, separate from the aperture through the flap, through which the resettable pushbutton circuit protector is accessible without having to remove the battery assembly from the pocket.

In another aspect of the invention, the battery pack further includes a holder, supported by the belt, for supplies used by the tool, such as cable ties. In another aspect of the invention, the battery pack further includes a plain hook, and a safety hook supported by the belt. The plain hook can be used for supporting the tool from the belt when it is not in use. The safety hook can also be used for supporting the tool from the belt when it is not in use, and when the user is climbing to a raised height, or does not have any hands free to catch the tool if it slips from the plain hook, or for some other reason wants to make sure that the tool is securely fastened to the belt.

In one aspect of the invention, the pocket containing the battery assembly, the holder, and the hooks are slideably supported by the belt and can be slid to an position along the length of the belt for optimum weight distribution and comfort of the user.

These and other features, objects and advantages of the present invention will be clearly understood upon review of the following detailed description, claims, and drawings.

BRIEF DESCRIPTION OF THE DRAWINGS

FIG. 2 is a perspective view illustrating the arrangement of internal components in a battery assembly included in the battery pack of FIG. 1.

FIG. 3 is an end view of the battery assembly of FIG. 1.

FIG. 4 is a front elevational view of the battery pack of FIG. 1, showing the battery pack belt electrically connected to a tool, and illustrating the tool being supported by a hook of the battery pack belt;

FIG. 5 is a perspective view of a European model battery charger used with the battery pack of FIG. 1.

FIG. 6 is a circuit diagram of the battery assembly shown in FIG. 2.

FIG. 7 is a rear elevational view of the battery pack belt of FIG. 1, showing the side that is closest to a user when the user wears the battery pack belt.

DETAILED DESCRIPTION OF THE PREFERRED EMBODIMENT OF THE INVENTION

Figure 1:
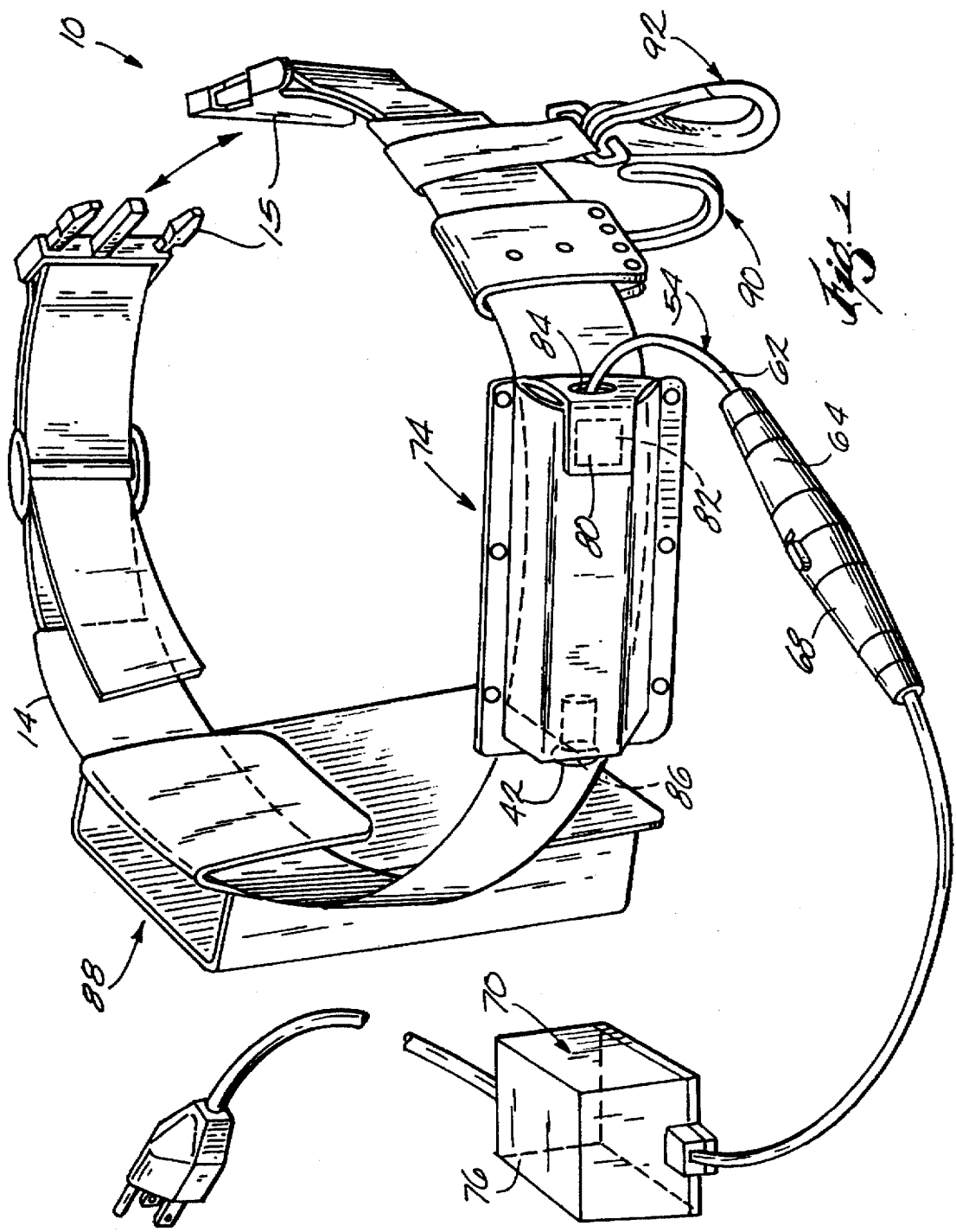
FIG. 1 is a perspective view of the battery pack belt, used with a U.S. model battery charger, and embodying various features of the invention.

Referring now to the drawings, a preferred embodiment of a battery pack 10 is shown.

The battery pack 10 is particularly configured to provide portable power for operating a hand held automatic tie gun (automatic cable tie tensioning tool) 12 which is disclosed in detail in U.S. Pat. No. 5,042,535, issued to Schlottke on Aug. 27, 1991, which is incorporated herein by reference.

The battery pack 10 includes a belt 14 supporting a battery assembly 16, which belt 14 fits adjustably around the waist of a user. The belt 14 is made of ballistic nylon, and includes a docking latching type buckle 15. Although other sizes can be employed, in the preferred embodiment, the belt 14 is adjustable from between 26 inches to 46 inches and has a width of between 2 to 4 inches.

The battery assembly 16 is shown in detail in FIGS. 2 and 3.

The battery assembly 16 includes exactly five parallel rows 18, 20, 22, 24, and 26 of C cells 28. Each row 18, 20, 22, 24, and 26 has exactly four of the C cells 28 arranged end to end in series. In each row, the positive terminal of one C cell 28 is in direct contact with the negative terminal of an adjacent one of the C cells 28. The battery assembly 16 thus has exactly 20 series connected C cells 28, which produce a voltage appropriate for operation of the tie gun 12.

In the preferred embodiment, the C cells 28 are rechargeable nickel cadmium C cells. Each of the C cells 28 has a diameter of 0.880 inch, a height of 1.66 inches, a voltage of 1.2 Volts, and a weight of 48 grams.

Each of the rows 18, 20, 22, 24, and 26 has opposite ends. The battery assembly 16 has opposite ends 30 and 32. The ends of the rows 18, 20, 22, 24, and 26 are in alignment at each end 30 and 32 of the battery assembly. In other words, each end 30 and 32 is substantially planar and perpendicular to the direction in which the rows extend, and each of the rows has one end in close contact with the end 30 and has an opposite end in close contact with the end 32.

All of the rows 18, 20, 22, 24, and 26 are electrically connected together in series. More particularly, the battery assembly 16 further includes a plurality of hotmelts 34, 36, 38, and 40 electrically connecting the end of one row to the end of an adjacent row.

The negative end of the row 26 is electrically connected to the positive end of the row 22 by the hotmelt 34. The negative end of the row 22 is electrically connected to the positive end of the row 20 by the hotmelt 36. The negative end of the row 20 is electrically connected to the positive end of the row 18 by the hotmelt 38. The negative end of the row 18 is electrically connected to the positive end of the row 24 by the hotmelt 40.

The positive ends of the rows 18 and 22 are located at the end 30 of the battery assembly 16, and the positive ends of the rows 20, 24, and 26 are located at the other end 32 of the battery assembly 16.

The battery assembly 16 further includes a resettable circuit protector or circuit breaker 42, including a reset pushbutton 44, electrically connected in series with the rows of cells. More particularly, the circuit protector 42 has a first terminal 46 which is electrically connected to the positive end of the row 26, and a second terminal 47. The resettable pushbutton circuit protector 42 is rated 2.0 Amps. In the illustrated embodiment, the resettable pushbutton circuit protector 42 is a 2.0 Amp Heinemann™ Series KD1 Re-Cirk-It™ circuit protector having a round cap.

The battery assembly 16 further includes a casing 48 which surrounds the rows 18, 20, 22, 24, and 26, and which casing 48 houses the circuit protector 42 such that the pushbutton 44 extends outside the casing 48. In the illustrated embodiment, the casing 48 comprises fishpaper 50 at each end 30 and 32, covering the ends of the rows 18, 20, 22, 24, and 26, and shrink wrap surrounding the rows and the fishpaper 50.

More particularly, the casing 48 houses the rows 18, 20, 22, 24, and 26 such that they are arranged three across, and two high with the first, second, and third row 18, 20, and 22 arranged in abutting side by side relation, with the fourth row 24 above the first row 18 in abutting relation, with the fifth row 26 above the third row 22 in abutting relation, with a cylindrical 0.624 inch diameter spacer 52 at the end 30 of the battery assembly 16, in between and abutting the fourth and fifth rows 24 and 26 and above and abutting the second row 20, and with the circuit protector 42 at the other end 32 of the battery assembly 16, in between and abutting the fourth and fifth rows 24 and 26 and above and abutting the second row 20.

The battery assembly 16 further includes a cable 54 having a first end 56 inside the casing 48, the first end 56 of the cable 54 having a first (black) lead 58 electrically connected to the other terminal 47 of the circuit protector 42.

The first end 56 of the cable 54 also has a second (white) lead 60 electrically connected to the negative end of the row 24. The cable 54 has a second end 62 outside the casing 48. The cable 54 extends out of the casing 48 from the end 30 of the battery assembly 16 (the end opposite to the end 32 having the circuit breaker 42).

The battery assembly 16 further includes a male Neutrik™ LNEMC connector 64 electrically connected to the second end 62 of the cable 54. The Neutrik™ LNEMC connector 64 is selectively connectable to a female Neutrik™ connector 66 on the tie gun 12. The same male Neutrik™ connector 64 is selectively connected to a female Neutrik™ connector 68 or 69 of a battery recharger 70 (U.S./Canada model) or 72 (European model) for recharging of the batteries 28 in the battery assembly 16 without having to remove the battery assembly 16 from the pocket 74 in which it is housed.

The battery assembly 16 has a weight that does not exceed two and one half pounds. More particularly, in the illustrated embodiment, the battery assembly 16 has a weight of 2.4 pounds.

The battery assembly 16 can be recharged approximately three hundred times. If the battery assembly 16 is used with the tie gun 12 for four to eight hours per day, the battery assembly 16 can be recharged in eight hours using the battery recharger 70 or 72. If the battery assembly 16 is used with the tie gun 12 for less than four hours per day, the battery assembly 16 can be recharged in four to six hours using the battery recharger 70 or 72.

The battery recharger 70 has an AC power cord and plug of the type that can be plugged into a 120 Volt, 60 Hz U.S. style household AC outlet. The battery recharger 70 includes an enclosure 76 housing the electronics thereof, which enclosure 76 is a Series Vivian enclosure having dimensions of 1.63 inches by 2.12 inches by 3.50 inches. The battery recharger 70 sends its output to the Neutrik™ LNEFC connector 68 which is selectively attached to the battery assembly 16 when it is desired to recharge the battery assembly 16. The battery recharger 70 supplies an output of 29 VDC at 160 mA to the battery assembly 16 via the Neutrik™ connector 68. In the preferred embodiment, the battery recharger 70 is an E.D.S. Company desk type battery recharger. This battery recharger has a weight of only 0.9 pounds.

The battery recharger 72 has an AC power cord and plug of the type that can be plugged into a 230 V, 50/60 Hz European style household AC outlet. The battery recharger 72 includes an enclosure 78 housing the electronics thereof, which enclosure 78 is a Series Vivian enclosure having dimensions of 1.63 inches by 2.12 inches by 3.50 inches. The battery recharger 72 supplies its output via the Neutrik™ LNEFC connector 69 which is selectively attached to the battery assembly 16 when it is desired to recharge the battery assembly 16. The battery recharger 72 supplies an output of 29 VDC at 160mA to the battery assembly 16 via the Neutrik™ connector 69. In the preferred embodiment, the battery recharger 72 is an E.D.S. Company desk type battery recharger. This battery recharger has a weight of only 0.9 pounds.

The battery pack 10 includes the pocket 74 supported by the belt 14, which pocket 74 houses the battery assembly 16. The pocket 74 provides for replacement of the battery assembly 16. More particularly, the pocket 74 has a cover in the form of a flap 80, which is movable between a closed position for retaining the battery assembly 16 in the pocket 74, and an open position for removal of the battery assembly 16. The flap 80 is fastened in its closed position by a velcro™ fastener 82. The flap 80 has therethrough an aperture 84 through which passes the cable 54 for the battery assembly 16.

The pocket 74 in which the battery assembly 16 is housed has an aperture 86, opposite the aperture 84 through the flap 80, through which the pushbutton 44 of the circuit protector 42 is accessible without having to remove the battery assembly 16 from the pocket 74.

The battery pack 10 further includes a pouch 88, supported by the belt 14, for supplies used by the tie gun 12, such as cable ties. The pouch 88 can also be used to store the battery recharger 70 or 72 and its cables, until such time that the battery recharger is needed. The pocket 74 and the pouch 88 are made of ballistic nylon.

The battery pack 10 further includes a plain hook 90, and a safety hook 92 supported by the belt 14. The plain hook 90 can be used for supporting the tool 12 from the belt 14 when the tool 12 is not in use. The safety hook 92 can also be used for supporting the tool 12 from the belt 14 when it is not in use, and when the user is climbing to a raised height, or does not have any hands free to catch the tool 12 if it slips from the plain hook 90, or for some other reason wants to make sure that the tool 12 is securely fastened to the belt 14.

The pocket 74, the pouch 88, and the hooks 90 and 92 are slideably supported by the belt 14 and can be slid to any position along the length of the belt 14 for optimum weight distribution and comfort of the user, and to accommodate both left handed and right handed users.

The total weight of the battery pack 10 is only 1.2 pounds.

While the preferred embodiments of the invention have been shown and described, it will be obvious to those skilled in the art that changes and modifications may be made therein without departing from the spirit of the invention, the scope of which is defined by the appended claims.

I claim:

1. A battery pack comprising:
    a belt adapted to be worn around the waist of a user, said belt having an adjustable girth so as to fit users having different waist sizes,
    a pocket supported by said belt, and
    a battery assembly removably housed in said pocket, said battery assembly including a plurality of rows of rechargeable cylindrical cells electrically connected together in series, a casing which surrounds said rows, a cable having a first end inside said casing, said first end of said cable having a first lead electrically connected to one end of said series connection of said cells, and said first end of said cable having a second lead electrically connected to the other end of said series connection of said cells, said cable having a second end outside said casing, said battery assembly further comprising a resettable circuit protector, including a reset pushbutton, electrically connected in series with said rows of cells, wherein said casing houses said circuit protector such that said pushbutton extends outside said casing, said pocket having therethrough an aperture aligned with said pushbutton whereby the user can access the pushbutton without having to remove said battery assembly from said pocket.

2. A battery pack in accordance with claim 1 wherein said battery assembly further includes a connector electrically connected to said second end of said cable.

3. A battery pack in accordance with claim 2 wherein said connector is a male connector which is selectively connectable to a tool.

4. A battery pack in accordance with claim 1 wherein said pocket has a cover in the form of a flap which is movable between a closed position for retaining said battery assembly in the pocket, and an open position for removal of the battery assembly.

5. A battery pack in accordance with claim 4 and further comprising a fastener associated with said flap and for selectively retaining said flap in its closed position.

6. A battery pack in accordance with claim 5 wherein said flap has therethrough an aperture through which passes said cable.

7. A battery pack in accordance with claim 1 and further comprising a pouch, supported by the belt and slidable along the girth of said belt to a user selected position, for storing supplies.

8. A battery pack in accordance with claim 1 and further comprising a plain hook supported by said belt, and a safety hook supported by said belt.

9. A battery pack in accordance with claim 8 wherein said pocket and said hooks are slideably supported by the belt and can be slid to any position along the girth of said belt for optimum weight distribution and comfort of the user.

10. A battery pack in accordance with claim 1 wherein said cells comprise exactly five parallel rows of C cells, each row having exactly four C cells arranged end to end in series.

11. A battery pack in accordance with claim 10 wherein said battery assembly has opposite ends, wherein said rows are arranged three across, and two high with a first, second, and third of said rows arranged in abutting side by side relation, with a fourth of said rows above said first row in abutting relation, with a fifth of said rows above said third row in abutting relation, with a cylindrical C cell sized spacer at one end of said battery assembly, in between and abutting said fourth and fifth rows and above and abutting said second row, and with said circuit protector at the other end of said battery assembly, in between and abutting said fourth and fifth rows and above and abutting said second row.

12. A battery pack in accordance with claim 11 and having a weight that does not exceed two and one half pounds.

13. A battery pack in accordance with claim 1 wherein said pocket closely houses said battery assembly in an orientation such that said rows of cells are disposed substantially horizontally when said belt is worn by a user.

14. A battery assembly comprising:
    a plurality of parallel rows of cells, each row having a plurality of cells arranged end to end in series, all of said rows being electrically connected together in series,
    a casing which surrounds said rows,
    a cable having a first lead electrically connected to one end of said series connection of said rows, and said first end of said cable having a second lead electrically connected to the other end of said series connection of said rows, said cable having a second end outside said casing, and
    a connector electrically connected to said second end of said cable,
    said battery assembly further comprising a resettable circuit protector, including a reset pushbutton, electrically connected in series with said rows of cells, wherein said casing houses said resettable circuit protector such that said pushbutton extends outside said casing.

15. A battery assembly in accordance with claim 14 wherein said battery assembly has opposite ends, wherein said rows are arranged three across, and two high with a first, second, and third of said rows arranged in abutting side by side relation, with a fourth of said rows above said first row in abutting relation, with a fifth of said rows above said third row in abutting relation, with a cylindrical spacer at one end of said battery assembly, in between and abutting said fourth and fifth rows and above and abutting said second row, and with said resettable circuit protector at the other end of said battery assembly, in between and abutting said fourth and fifth rows and above and abutting said second row.

16. A battery assembly in accordance with claim 15 wherein said cable extends out of said casing from the end of said battery assembly opposite to the end having said resettable circuit protector.

17. A battery assembly in accordance with claim 15 and having exactly 20 C cells.

18. A battery assembly in accordance with claim 15 and having a weight that does not exceed two and one half pounds.

19. A battery assembly in accordance with claim 14 wherein said connector is a male connector.

20. A battery assembly in accordance with claim 14 wherein each of said rows has opposite ends, wherein said battery assembly has opposite ends, and wherein the ends of the rows are in alignment at each end of said battery assembly.

21. A battery assembly in accordance with claim 14 and further comprising a hotmelt electrically connecting one of said rows to another one of said rows.

22. A battery assembly in accordance with claim 14 wherein said cells are nickel cadmium cells.

23. A battery assembly in accordance with claim 14 wherein said cells are rechargeable.

24. A battery assembly in accordance with claim 14 wherein said resettable circuit protector is rated 2.0 Amps.

25. An apparatus as set forth in claim 1 wherein said cells are rechargeable and further including a recharger connectable with said male connector of said battery assembly.

26. A battery pack as set forth in claim 2 and further including a recharger connectable to said connector.

27. A battery assembly as set forth in claim 23 and further including a recharger connectable to said connector.

28. A battery assembly as set forth in claim 14 wherein said connector is electrically connectable to a portable tool.

29. An apparatus as set forth in claim 1 wherein said plurality of rows of cells is five and wherein said plurality of cells in each row is four.

30. A battery assembly as set forth in claim 14 wherein said plurality of rows is five and wherein said plurality of cells in each row is four.

* * * * *